United States Patent
Sharp et al.

(10) Patent No.: US 10,102,391 B2
(45) Date of Patent: Oct. 16, 2018

(54) HARDWARE ENFORCED CONTENT PROTECTION FOR GRAPHICS PROCESSING UNITS

(71) Applicant: QUALCOMM Incorporated, San Diego, CA (US)

(72) Inventors: Colin Christopher Sharp, Cardiff, CA (US); Ramesh Viswanathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 14/821,174

(22) Filed: Aug. 7, 2015

(65) Prior Publication Data

US 2017/0039381 A1    Feb. 9, 2017

(51) Int. Cl.
  *G06F 21/62*    (2013.01)
  *G06F 21/10*    (2013.01)
  *G06F 3/06*     (2006.01)
  *G06T 1/20*     (2006.01)
  *G06T 1/60*     (2006.01)

(52) U.S. Cl.
  CPC ........ *G06F 21/6218* (2013.01); *G06F 3/0622* (2013.01); *G06F 3/0634* (2013.01); *G06F 3/0673* (2013.01); *G06F 21/10* (2013.01); *G06T 1/20* (2013.01); *G06T 1/60* (2013.01); *G06T 2200/28* (2013.01)

(58) Field of Classification Search
  CPC ...... G06F 21/10; G06F 21/6218; G06F 3/062; G06F 3/0622; G06F 3/0623; G11B 20/0086; G06T 1/60
  See application file for complete search history.

(56) References Cited

U.S. PATENT DOCUMENTS

| | | |
|---|---|---|
| 4,184,201 A | 1/1980 | Melberg et al. |
| 7,055,038 B2 | 5/2006 | Porter et al. |
| 7,337,329 B2 | 2/2008 | Evans |
| 7,401,358 B1 | 7/2008 | Christie et al. |
| 7,474,312 B1 | 1/2009 | Rohrer et al. |

(Continued)

FOREIGN PATENT DOCUMENTS

| | | |
|---|---|---|
| CN | 101802774 A | 8/2010 |
| CN | 102567662 A | 7/2012 |

(Continued)

OTHER PUBLICATIONS

International Search Report and Written Opinion from International Application No. PCT/US2016/043903, dated Oct. 26, 2016, 12 pp.

(Continued)

*Primary Examiner* — Meng Li
*Assistant Examiner* — Shaqueal D Wade
(74) *Attorney, Agent, or Firm* — Shumaker & Sieffert, P.A.

(57) ABSTRACT

This disclosure proposes techniques for graphics processing. In one example, a graphics processing unit (GPU) is configured to access a memory according to one of an unsecure mode and a secure mode. The GPU may include a memory access controller configured to direct memory transactions from at least one hardware unit of the GPU to an unsecure memory unit or a secure memory unit based on the unsecure mode or secure mode and a resource descriptor associated with a memory resource.

16 Claims, 12 Drawing Sheets

(56) References Cited

U.S. PATENT DOCUMENTS

| | | | |
|---|---|---|---|
| 7,681,077 B1* | 3/2010 | Eitzmann | G06F 11/3648 714/20 |
| 7,782,329 B2 | 8/2010 | Rohr et al. | |
| 8,156,565 B2 | 4/2012 | MacDonald et al. | |
| 8,478,959 B1 | 7/2013 | Wyatt | |
| 8,631,212 B2* | 1/2014 | Kegel | G06F 12/1081 711/152 |
| 8,707,056 B2 | 4/2014 | Felton | |
| 8,931,108 B2 | 1/2015 | Sharp et al. | |
| 8,959,304 B2 | 2/2015 | Symes et al. | |
| 9,191,202 B2 | 11/2015 | Isozaki et al. | |
| 9,767,320 B2 | 9/2017 | Sharp et al. | |
| 2004/0153672 A1 | 8/2004 | Watt et al. | |
| 2006/0015749 A1 | 1/2006 | Mittal | |
| 2006/0048221 A1 | 3/2006 | Morais et al. | |
| 2007/0088959 A1 | 4/2007 | Cox et al. | |
| 2008/0077793 A1 | 3/2008 | Tan et al. | |
| 2008/0091930 A1 | 4/2008 | Conti et al. | |
| 2009/0079746 A1 | 3/2009 | Howard et al. | |
| 2009/0150631 A1 | 6/2009 | Wilsey et al. | |
| 2009/0290709 A1 | 11/2009 | MacDonald et al. | |
| 2009/0316889 A1 | 12/2009 | MacDonald et al. | |
| 2010/0011200 A1 | 1/2010 | Rosenan et al. | |
| 2010/0031360 A1 | 2/2010 | Seshadri et al. | |
| 2010/0146202 A1 | 6/2010 | Nystad et al. | |
| 2010/0214304 A1 | 8/2010 | Jonas | |
| 2011/0141124 A1 | 6/2011 | Halls et al. | |
| 2011/0208935 A1 | 8/2011 | Grisenthwaite | |
| 2012/0079270 A1 | 3/2012 | Patel | |
| 2012/0102557 A1 | 4/2012 | Felton | |
| 2012/0221795 A1 | 8/2012 | Hoshaku et al. | |
| 2013/0007407 A1 | 1/2013 | Gupta et al. | |
| 2013/0132735 A1* | 5/2013 | Kottilingal | G06F 21/6218 713/189 |
| 2013/0166922 A1* | 6/2013 | Wong | G06F 21/10 713/193 |
| 2013/0305388 A1 | 11/2013 | Kottilingal et al. | |
| 2014/0104287 A1 | 4/2014 | Nalluri et al. | |
| 2014/0237609 A1 | 8/2014 | Sharp et al. | |
| 2015/0002523 A1 | 1/2015 | Zeng et al. | |
| 2015/0052325 A1* | 2/2015 | Persson | G06F 12/1433 711/163 |
| 2015/0220458 A1* | 8/2015 | Bhooma | G06F 21/52 711/163 |
| 2016/0125193 A1 | 5/2016 | Dai et al. | |

FOREIGN PATENT DOCUMENTS

| | | |
|---|---|---|
| EP | 1801725 A2 | 6/2007 |
| JP | 2005528678 A | 9/2005 |
| JP | 2009523269 A | 6/2009 |
| JP | 2013109393 A | 6/2013 |
| JP | 2014191509 A | 10/2014 |
| KR | 20040000348 A | 1/2004 |
| KR | 20070063465 A | 6/2007 |
| KR | 20100044907 A | 4/2010 |
| WO | 03090074 A2 | 10/2003 |
| WO | 2007097123 A1 | 8/2007 |
| WO | 2011074168 A1 | 6/2011 |
| WO | 2012020236 A1 | 2/2012 |
| WO | 2012154996 A1 | 11/2012 |
| WO | 2013169434 A1 | 11/2013 |
| WO | 2014126597 A1 | 8/2014 |
| WO | 2015002851 A1 | 1/2015 |

OTHER PUBLICATIONS

U.S. Appl. No. 14/821,092 filed by Colin Christopher Sharp et al., filed Aug. 7, 2015.

Second Written Opinion from International Application No. PCT/US2016/043903, dated Jul. 5, 2017, 8 pp.

International Preliminary Report on Patentability from International Application No. PCT/US2016/043903, dated Oct. 27, 2017, 9 pp.

* cited by examiner

HARDWARE ENFORCED CONTENT PROTECTION FOR GRAPHICS PROCESSING UNITS

TECHNICAL FIELD

This disclosure relates to techniques for graphics processing, and more specifically to techniques for content protection.

BACKGROUND

Modern operating systems, including open platforms (e.g., Android or other open source platforms) and closed platforms (e.g., Microsoft Windows®), are not typically trusted in terms of protecting secure content which is streamed to, or processed by, such open platforms. While modern operating systems provide a level of security via the user-kernel mode separation, ultimately components of kernel mode, both in closed platforms, and particularly in open platforms do not provide a strong level of trust. Kernel mode drivers can easily be installed, and a malicious kernel mode driver naturally bypasses the security boundary. Kernel mode hardware drivers in such open platforms are used to control the operation of hardware (e.g., graphics processing units (GPUs)) that may process secure content. However, because such drivers are often open source, and/or not considered to be "secure" in relation to protected content, they are more susceptible to alteration by third parties. Such alterations may cause the protected content (e.g., digital rights managed (DRM) content) that is streamed through or processed by the hardware controlled by such drivers to be stored in unsecure memories and copied. As such, control of secure content on open platforms is often difficult.

SUMMARY

In general, this disclosure describes techniques for hardware enforced content protection for a graphics processing unit (GPU). To control secure content on a hardware platform, access to secure memory may be controlled by hardware such as a GPU.

In one example of the disclosure, an apparatus for graphics processing comprises a GPU configured to access a memory according to one of an unsecure mode and a secure mode, the GPU comprising a memory access controller configured to direct memory transactions from at least one hardware unit of the GPU to a secure context bank in a memory controller when the GPU is operating in a secure mode, and configured to direct memory transactions from the at least one hardware unit of the GPU to an unsecure context bank in the memory controller when the GPU is operating in the unsecure mode.

In another example of the disclosure, a GPU comprises one or more hardware units configured to access a memory according to one of an unsecure mode and a secure mode of the GPU, and a memory access controller configured to direct memory transactions from at least one of the one or more hardware units of the GPU to a secure context bank in a memory controller when the GPU is operating in a secure mode, and configured to direct memory transactions from the at least one of the one or more hardware units of the GPU to an unsecure context bank in the memory controller when the GPU is operating in the unsecure mode.

In another example of the disclosure, a method for graphics processing comprises accessing an unsecure portion of a memory, with a GPU, according an unsecure mode by directing memory transactions from at least one hardware unit of the GPU to an unsecure context bank in a memory controller, and accessing a secure portion of the memory, with the GPU, according to a secure mode by directing memory transactions from the at least one hardware unit of the GPU to a secure context bank in the memory controller.

In another example of the disclosure, an apparatus for graphics processing comprises means for accessing an unsecure portion of a memory according an unsecure mode by directing memory transactions from at least one hardware unit of a GPU to an unsecure context bank in a memory controller, and means for accessing a secure portion of the memory according to a secure mode by directing memory transactions from the at least one hardware unit of the GPU to a secure context bank in the memory controller.

In another example of the disclosure, an apparatus for graphics processing comprises a GPU configured to access a first memory unit according to one of an unsecure mode and a secure mode and a respective resource descriptor associated with each of a plurality of memory resources, the GPU comprising a memory access controller configured to read the respective resource descriptor associated with each of the plurality of memory resources, the memory access controller configured to receive a request for a memory transaction to the first memory unit, the memory access controller configured to, in response to the request, direct all read and write memory transactions relating to memory resources of the plurality of memory resources for which the respective resource descriptor is a secure resource descriptor to a secure portion of the first memory unit when the GPU is operating according to the secure mode, the memory access controller configured to, in response to the request, direct all read memory transactions relating to memory resources of the plurality of memory resources for which the respective resource descriptor is an unsecure resource descriptor to an unsecure portion of the first memory unit when the GPU is operating according to the secure mode, and the memory access controller configured to, in response to the request, drop all write memory transactions relating to memory resources of the plurality of memory resources for which the respective resource descriptor is the unsecure resource descriptor when the GPU is operating according to the secure mode.

In another example of the disclosure, a method comprises reading a respective resource descriptor for a respective memory resource of a plurality of memory resources, receiving a request for a memory transaction to a first memory unit, directing, in response to the request, read and write memory transactions relating to memory resources of the plurality of memory resources for which the respective resource descriptor is a secure resource descriptor to a secure portion of the first memory unit when a GPU is operating according to a secure mode, directing, in response to the request, read memory transactions relating to memory resources of the plurality of memory resources for which the respective resource descriptor is an unsecure resource descriptor to an unsecure portion of the first memory unit when the GPU is operating according to the secure mode, and dropping, in response to the request, write memory transactions relating to memory resources of the plurality of memory resources for which the respective resource descriptor is the unsecure resource descriptor when the GPU is operating according to the secure mode.

In another example of the disclosure, an apparatus for graphics processing comprises means for reading a respective resource descriptor for a respective memory resource of a plurality of memory resources, means for receiving a request for a memory transaction to a first memory unit, means for directing, in response to the request, read and write memory transactions relating to memory resources of the plurality of memory resources for which the respective resource descriptor is a secure resource descriptor to a secure portion of the first memory unit when a GPU is operating according to a secure mode, means for directing, in response to the request, read memory transactions relating to memory resources of the plurality of memory resources for which the respective resource descriptor is an unsecure resource descriptor to an unsecure portion of the first memory unit when the GPU is operating according to the secure mode, and means for dropping, in response to the request, write memory transactions relating to memory resources of the plurality of memory resources for which the respective resource descriptor is the unsecure resource descriptor when the GPU is operating according to the secure mode.

In another example, this disclosure describes a computer-readable storage medium storing instructions that, when executed, cause one or more processors to read a respective resource descriptor for a respective memory resource of a plurality of memory resources, receive a request for a memory transaction to a first memory unit, direct, in response to the request, read and write memory transactions relating to memory resources of the plurality of memory resources for which the respective resource descriptor is a secure resource descriptor to a secure portion of the first memory unit when a GPU is operating according to a secure mode, direct, in response to the request, read memory transactions relating to memory resources of the plurality of memory resources for which the respective resource descriptor is an unsecure resource descriptor to an unsecure portion of the first memory unit when the GPU is operating according to the secure mode, and drop, in response to the request, write memory transactions relating to memory resources of the plurality of memory resources for which the respective resource descriptor is the unsecure resource descriptor when the GPU is operating according to the secure mode.

The details of one or more examples are set forth in the accompanying drawings and the description below. Other features, objects, and advantages will be apparent from the description and drawings, and from the claims.

DETAILED DESCRIPTION

Figure 1:
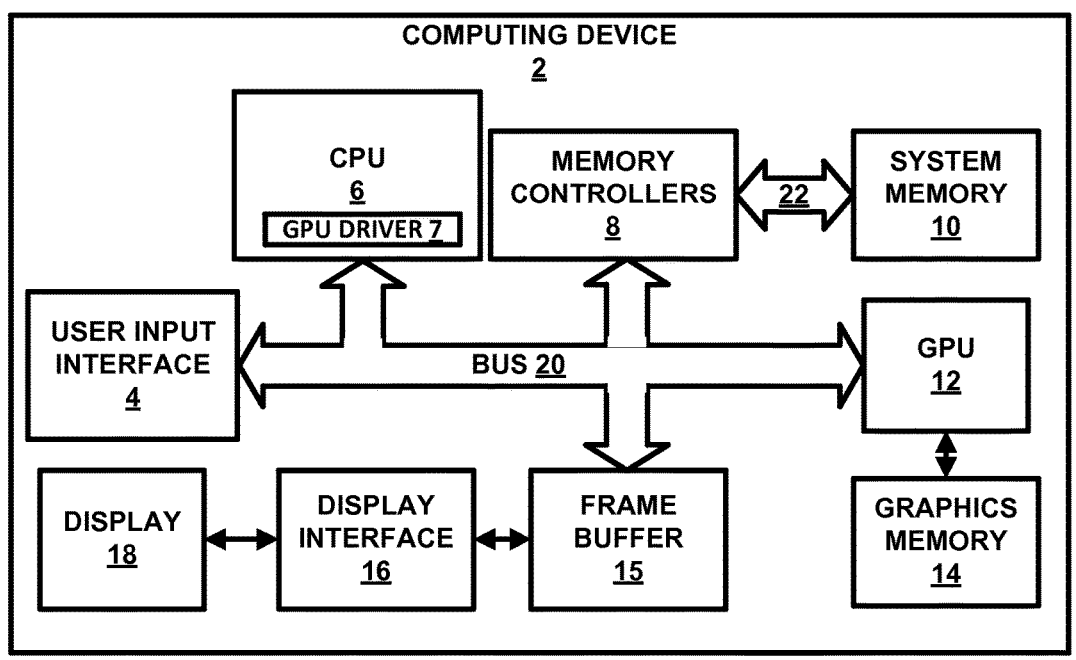
FIG. 1 is a block diagram showing an example computing device configured to use the techniques of this disclosure.

This disclosure relates to techniques for graphics processing, and more specifically to techniques for hardware enforced content protection for a graphics processing unit (GPU).

Modern operating systems, including open platforms (e.g., Android or other open source platforms) and closed platforms (e.g., Microsoft Windows®), are not typically trusted in terms of protecting secure content which is streamed to, or processed by, such open platforms. While modern operating systems provide a level of security via the user-kernel mode separation, ultimately components of kernel mode, both in closed platforms, and particularly in open platforms, do not provide a strong level of trust. Kernel mode drivers can easily be installed, and a malicious kernel mode driver naturally bypasses the security boundary. Kernel mode hardware drivers in such open platforms are used to control the operation of hardware (e.g., graphics processing units (GPUs)) that may process secure content. However, because such drivers are often open source, and/or not considered to be "secure" in relation to protected content, they are more susceptible to alteration by third parties. Such alterations may cause the protected content (e.g., digital rights managed (DRM) content) that is streamed through or processed by the hardware controlled by such drivers to be stored in unsecure memories and copied. As such, control of secure content on open platforms is often difficult. To address this problem, this disclosure proposes a method and apparatus whereby access to secure memory is controlled by the hardware itself (e.g., by a GPU).

Rather than controlling hardware access to secure or unsecure memory directly through driver code, this disclosure proposes, in one example, using the graphics driver (e.g., an open source unsecure driver) to only place the GPU in either a secure mode or an unsecure mode. Once placed in the secure mode, the GPU components may be configured such that read and/or write access to secure and unsecure memory by the GPU may be restricted based on the mode (i.e., secure or unsecure mode) of the GPU. For example, in secure mode, certain GPU components may be configured such that they are restricted to only making writes into the secure memory region. This prevents an untrusted driver from using the GPU to copy memory content from the secure memory region to an unsecure memory region. Other techniques for restricting GPU access to secure memory in the secure mode, placing the GPU into one of an unsecure mode or secure mode, and associating certain data resources with secure memory or unsecure memory will be discussed in more detail below.

In one example of the disclosure, in this secure mode, the GPU may be configured to read both secure (e.g., copy protected (CP)) content as well as unsecure content (e.g., content stored in an unsecured memory). In the unsecure mode, the GPU may be configured such that GPU components are denied all access to secure memory. In this way, even if the unsecure driver were altered to place the GPU in an unsecure mode, the GPU itself would be prevented from reading any data from a secure memory. As such, access to secure content in the secure memory is prevented.

FIG. 1 is a block diagram illustrating an example computing device 2 that may be used to implement the techniques of this disclosure for hardware enforced content protection for a GPU. Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a so-called smartphone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a user input interface 4, a central processing unit (CPU) 6, one or more memory controllers 8, a system memory 10, a graphics processing unit (GPU) 12, a graphics memory 14, a display interface 16, a display 18 and buses 20 and 22. Note that, in some examples, graphics memory 14 may be "on-chip" with GPU 12. In some cases, all hardware elements show in FIG. 1 may be on-chip, for example, in a system on a chip (SoC) design. User input interface 4, CPU 6, memory controllers 8, GPU 12 and display interface 16 may communicate with each other using bus 20. Memory controllers 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad, a touch screen, or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, an Open Computing Language (OpenCL®) API, a Direct3D API, an X3D API, a RenderMan API, a WebGL API or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controllers 8 facilitate the transfer of data going into and out of system memory 10. For example, memory controllers 8 may receive memory read and write commands, and service such commands with respect to system memory 10 in order to provide memory services for the components in computing device 2. Memory controllers 8 are communicatively coupled to system memory 10 via memory bus 22. Although memory controllers 8 are illustrated in FIG. 1 as being a processing module that is separate from both CPU 6 and system memory 10, in other examples, some or all of the functionality of memory controllers 8 may be implemented on one or any of CPU 6, GPU 12 and system memory 10. System memory 10 may comprise one or memory units. The memory units may be divided physically (e.g., separate physical disks or solid state memory units) or may be divided by memory address range. In particular, system memory 10 may be divided into two or more memory units consisting of "secure" memory units and "unsecure" memory units. In some examples, secure memory units may utilize encryption and/or other digital rights management (DRM) techniques to prevent access, copying, or deciphering of data stored thereon.

Memory controllers 8 may also include one or more memory management units (MMUs), including an IOMMU (i.e., input/output MMU) for controlling IO device access (e.g., a GPU) to system memory 10. The memory management units may implement a virtual memory system. The virtual memory space may be divided into a plurality of virtual pages. These virtual pages may be contiguous, but the physical pages in system memory 10 to which these virtual pages correspond may not be contiguous in system memory 10. Pages may be considered as the minimum units that an MMU may be able to manage.

Modern operating systems (OS) that run on central processing units (CPUs) typically use a virtual memory scheme for allocating memory to multiple programs operating on the CPU. Virtual memory is a memory management technique that virtualizes a computer system's physical memory (e.g., RAM, disk storage, etc.) so that an application need only refer to one set of memory (i.e., the virtual memory). Virtual memory consists of contiguous address spaces that are mapped to locations in physical memory. In this way, the fragmentation of physical memory is "hidden" from the applications, which instead may interact with contiguous blocks of virtual memory. The contiguous blocks in virtual memory are typically arranged into "pages." Each page is some fixed length of contiguous blocks of virtual memory addresses. Mapping from the virtual memory to the physical memory is often handled by a memory management unit (MMU). Virtual memory space that is currently mapped to locations in physical memory is considered to be "backed" to physical memory.

The mapping of locations in virtual memory space to physical memory is stored with a translation lookaside buffer (TLB). The TLB is used by the MMU to quickly translate virtual addresses to physical addresses. The TLB may be implemented as a content-addressable memory (CAM) that uses a virtual memory address as an input and outputs a physical memory address. The MMU may then quickly retrieve the requested data using the output physical memory address.

Figure 2:
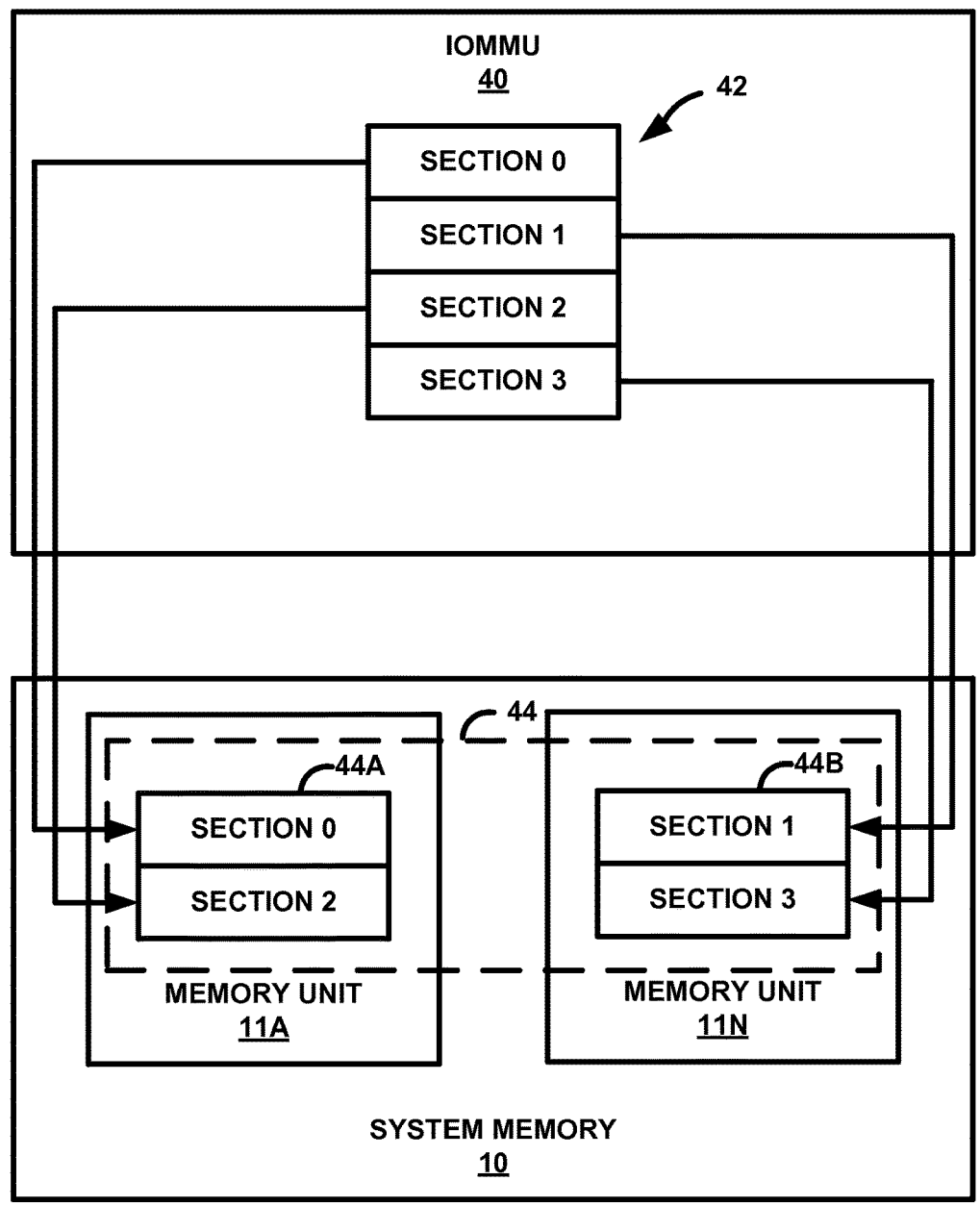
FIG. 2 is a conceptual diagram illustrating an example physical page of a system memory of FIG. 1.

FIG. 2 is a conceptual diagram illustrating an example physical page of system memory 10. For example, FIG. 2 illustrates an IOMMU 40 including a virtual page 42 which includes four sections (sections 0-3). It should be understood that virtual page 42 is a virtual construct that is illustrated in FIG. 2 for ease of understanding. In FIG. 2, system memory 10 may include a physical page 44 that corresponds to virtual page 42.

Physical page 44 may be stored across multiple memory units of system memory 10. For example, physical page 44 may encompass both memory unit 11A and memory unit 11N. In one example, memory unit 11A is a "secure" memory unit and memory unit 11N is an "unsecure" memory unit. Memory unit 11A may store a portion of physical page 44, indicated as portion 44A, and memory unit 11N may store a portion of physical page 44, indicated as portion 44B. As illustrated, memory unit 11A stores section 0 and section 2 of physical page 44, and memory unit 11N stores section 1 and section 3 of physical page 44.

The example of FIG. 2 only includes two memory units for purposes of illustration, but any number of memory units may be used. For instance, referring back to FIG. 1, GPU driver 7 may transmit instructions that cause GPU 12 to store pixel values or any other computed value, and may transmit the virtual addresses for where the pixel value are to be stored. GPU 12, in turn, may request IOMMU 40 to store the pixel values in accordance with the virtual addresses. IOMMU 40, in turn, may map the virtual addresses to physical addresses and store the pixel values in pages of system memory 10 in an interleaving manner based on the physical addresses.

Returning to FIG. 1, system memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store DRM protected game content or decoded video produced by GPU 12. In this situation, such DRM-protected content is preferably stored in a secure memory unit of system memory 10. As other examples, system memory 10 may store other graphics data such as any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of using other, slower system memory. This allows GPU 12 to operate in a more efficient manner by eliminating the need of GPU 12 to read and write data via system bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Typically, frame buffer 15 would be allocated within system memory 10, but may in some circumstances be an independent memory. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone or tablet computer. Alternatively, display 18 may be a stand-alone device coupled to computing device 2 via a wired or wireless communications link. For instance, display 18 may be a computer monitor or flat panel display connected to a personal computer via a cable or wireless link.

Figure 3:
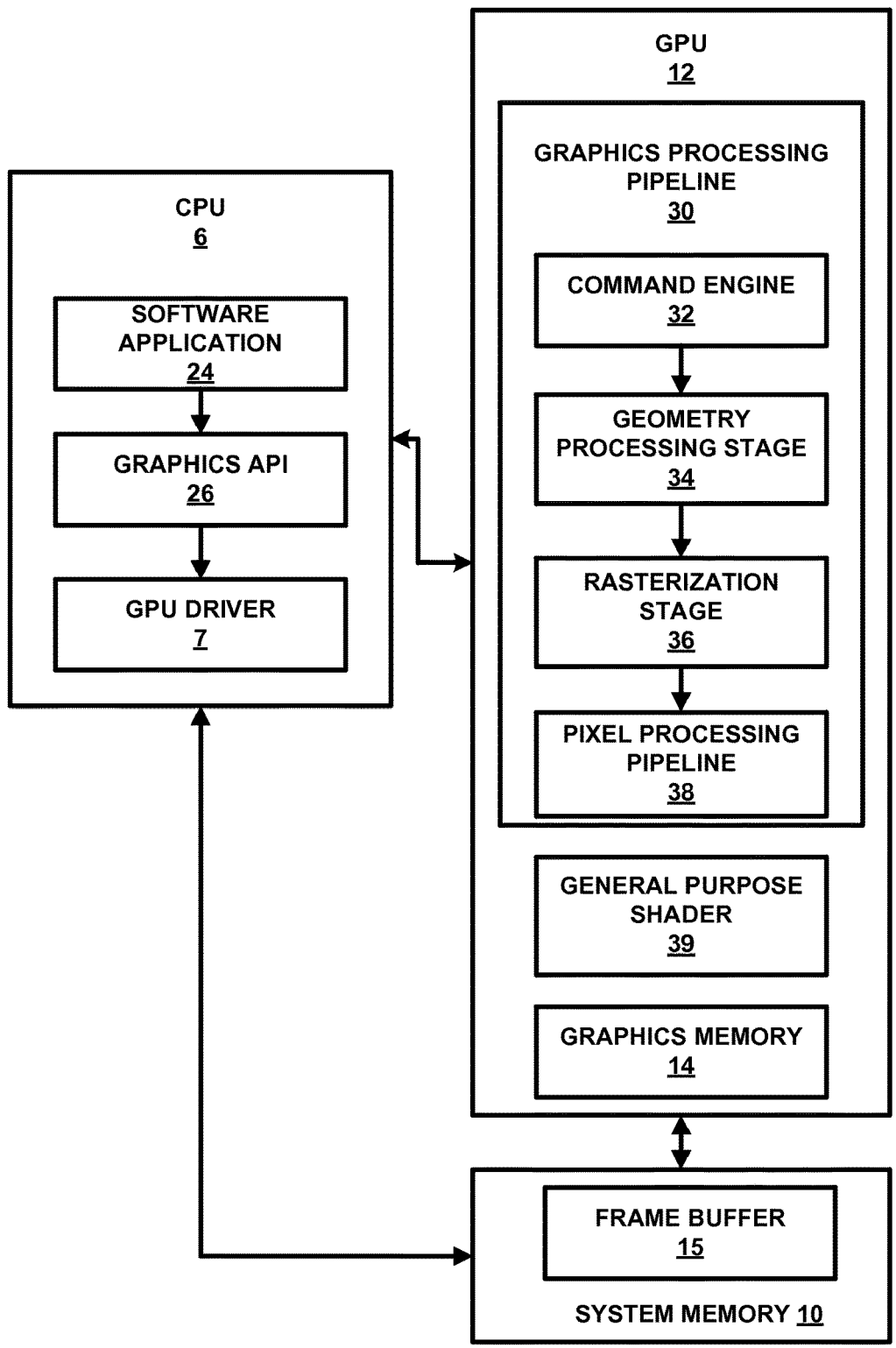
FIG. 3 is a block diagram showing example processing units configured to use the techniques of this disclosure.

FIG. 3 is a block diagram illustrating example implementations of CPU 6, GPU 12, and system memory 10 of FIG. 1 in further detail. CPU 6 may include at least one software application 24, a graphics API 26, and a GPU driver 7, each of which may be one or more software applications or services that execute on CPU 6. GPU 12 may include a 3D graphics processing pipeline 30 that includes a plurality of graphics processing stages that operate together to execute graphics processing commands. GPU 12 may be configured to execute graphics processing pipeline 30 in a variety of rendering modes, including a binning rendering mode (also called a tile-based or deferred rendering mode) and a direct rendering mode. GPU 12 may also be operable to execute a general purpose shader 39 for performing more general computations applicable to be executed by the highly parallel nature of GPU hardware. Such general-purpose applications may be a so-called general-purpose graphics processing unit (GPGPU) and may conform to a general-purpose API, such as OpenCL.

As shown in FIG. 3, graphics processing pipeline 30 may include a command engine 32, a geometry processing stage 34, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10, that may itself include frame buffer 15. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics. Software application 24 may also be an application that uses the GPU to perform more general calculations, such as in a GPGPU application.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 15 associated with a display device. Graphics processing pipeline 30 may be configured to execute in one of a plurality of different rendering modes, including a binning rendering mode and a direct rendering mode.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations. In accordance with some examples of this disclosure, a pixel shader program may also include instructions that selectively cause texture values to be retrieved for source pixels based on corresponding destination alpha values for the source pixels.

Graphics processing pipeline 30 may be configured to receive one or more graphics processing commands from CPU 6, via graphics driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics processing pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Pixel values may also be represented by a luma component (Y) and one or more chroma components (e.g., U and V). Although frame buffer 15 and system memory 10 are illustrated as being separate memory units, in other examples, frame buffer 15 may be part of system memory 10.

General purpose shader 39 may be any application executable on GPU 12 to perform calculations. Typically, such calculations are of the type that takes advantage of the highly parallel structure of GPU processing cores, including arithmetic logic units (ALUs). An example general purpose shader 39 may conform to the OpenCL API. OpenCL is an API that allows an application to have access across multiple processors in a heterogeneous system (e.g., a system including a CPU, GPU, DSP, etc.). Typically, in an OpenCL conforming application, GPU 12 would be used to perform non-graphical computing. Examples of non-graphical computing applications may include physics-based simulations, fast Fourier transforms, audio signal processing, digital image processing, video processing, image post filtering, computational camera, climate research, weather forecasting, neural networks, cryptography, and massively parallel data crunching, among many others.

Figure 4:
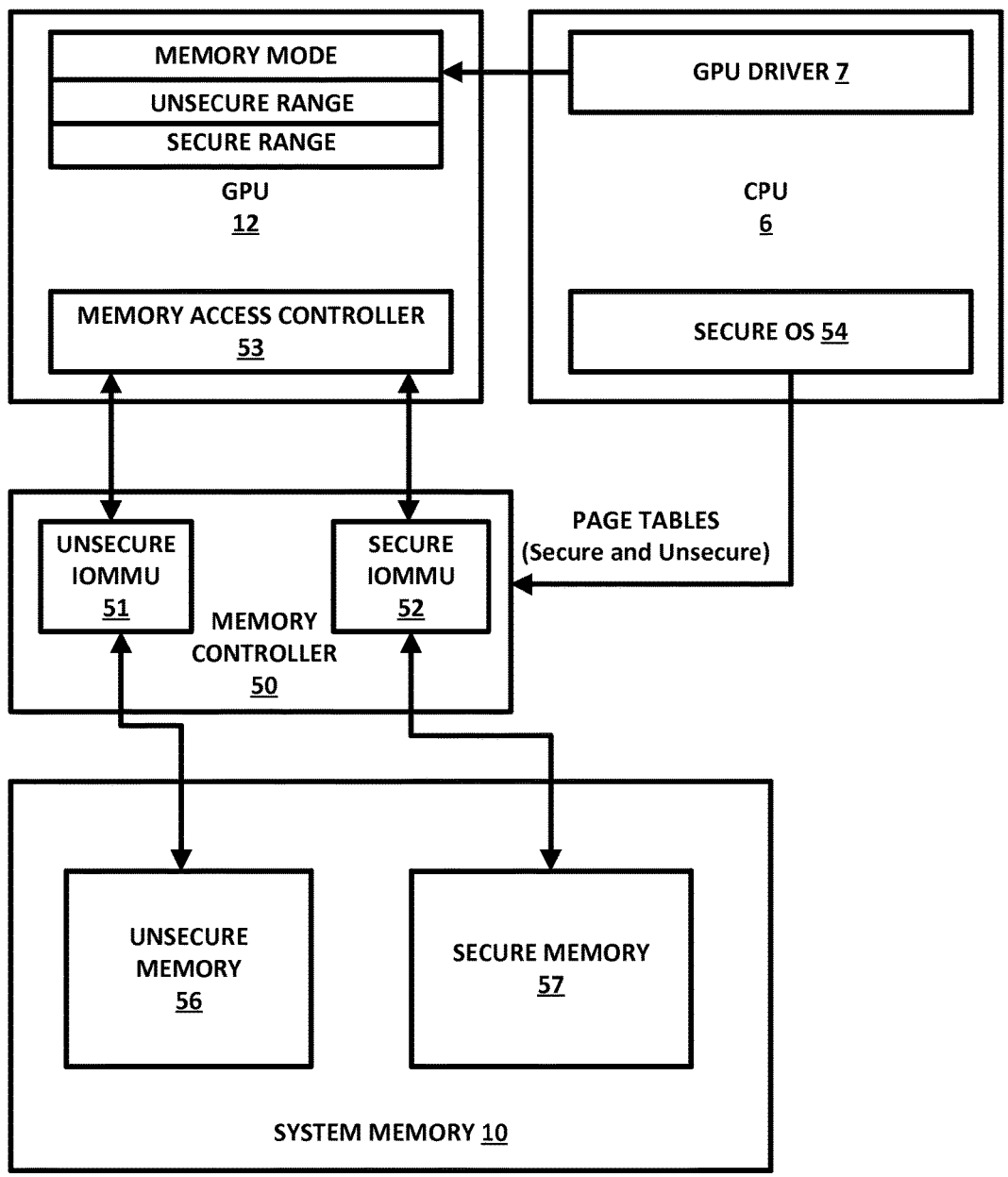
FIG. 4 is a block diagram showing an example structure configured to perform the hardware enforced content protection techniques of this disclosure.

FIG. 4 is a block diagram showing an example device configured to implement the hardware enforced content protection techniques of this disclosure. In the example of FIG. 4, GPU 12 may be configured to operate according to a secure mode or an unsecure mode. In one example of the disclosure, in secure mode, GPU 12 is restricted from writing output data (e.g., game data, video, etc.) to unsecure memory 56. Rather, in secure mode, GPU 12 may only write output data to secure memory 57. While in secure mode, GPU 12 may read data from either secure memory 57 or unsecure memory 56. In unsecure mode, for this example, GPU 12 is restricted from reading any data from secure memory 57. Rather, in unsecure mode, GPU 12 may only read data from unsecure memory 56. Likewise, while in unsecure mode, GPU 12 may only write data to unsecure memory 56.

Unsecure memory 56 and secure memory 57 may be any type of memory, including one or more volatile or non-volatile memories or storage devices. Example memory and storage devices include RAM, SRAM, DRAM, ROM, EPROM, EEPROM, Flash memory, magnetic data media or optical storage media. Secure memory 57 includes additional features not found in unsecure memory 56. For example, secure memory 57 may utilize encryption, authentication and/or other digital rights management techniques to prevent access to, copying of, or deciphering of data stored thereon. In general, secure memory 57 may be considered to be one portion of system memory 10 and unsecure memory 56 may be considered to be another portion of system memory 10.

In accordance with one or more examples of the disclosure described below, GPU 12 may be configured to control or otherwise affect where data is read from and written to using memory access controller 53. Memory access controller 53 is responsive to the mode GPU 12 is operating under (i.e., secure mode or unsecure mode), and makes read/write decisions based on the mode. In general, memory access controller 53 may be configured to impose a restriction on the nature of the transactions between GPU 12 and memory controller 50. Memory access controller 53 may be configured to be responsive to the mode (i.e., the secure mode or unsecure mode) in which GPU 12 is currently operating, and may impose restrictions to memory transactions in accordance with the examples of the disclosure below.

In one example of the disclosure, the GPU memory mode (e.g., secure mode or unsecure mode) is set by GPU driver 7 operating on CPU 6. GPU driver 7 may change the memory mode in GPU 12 in several different ways. In one example, GPU driver 7 may directly write a value into a register in GPU 12 that indicates to GPU 12 which memory mode to use (e.g., secure mode or unsecure mode). In another example, GPU 12 may include one or more instructions in a command stream executable by GPU 12 that instruct GPU 12 itself to write a certain value to a register that indicates which memory mode to use. In this way, GPU driver 7 may only select the memory mode that the GPU operates under, and does not make any direct instructions that specifies which data is to be written to which memory. As such, even if GPU driver 7 were altered to place GPU 12 in an unsecure mode, through the function of memory access controller 53, GPU 12 would prevent any read access from secure memory 57, as memory access controller 53 is only able to read from unsecure memory 56 in the unsecure mode. Likewise, even if GPU driver 7 were altered to place GPU 12 in a secure mode, through the function of memory access controller 53, GPU 12 would prevent any write access to unsecure memory 56, as memory access controller 53 is only able to write to secure memory 57 in the secure mode. As such, the techniques of this disclosure may still prevent copying of data to unsecure memory 56, even if GPU driver 7 were altered to place GPU 12 in a secure mode.

In one example of the disclosure, memory access controller 53 is configured to access secure memory 57 and unsecure memory 56 via secure and unsecure memory management unit (MMU) page tables, respectively. In this example, virtual address ranges are provided to GPU 12 by GPU driver 7. The virtual address ranges include a range of virtual addresses for the secure memory and a range of virtual addresses for the unsecure memory. When placed in secure mode by GPU driver 7, GPU 12 utilizes the range of virtual addresses for the secure memory to perform reads and writes. GPU 12 would also be able to use the range of virtual addresses for the unsecure memory to perform reads in the secure mode, but not to perform writes, thereby preventing unauthorized copying of protected data from the secure memory. When placed in unsecure mode by GPU driver 7, GPU 12 would utilize the range of virtual addresses for the unsecure memory to perform reads and writes.

In one example, memory access controller 53 routes reads and writes to the appropriate memory units (e.g., secure memory 57 or unsecure memory 56) by determining if the virtual address used in the read or write request are within an unsecure range of virtual memory addresses or within a secure range of virtual addresses. Based on the range determination, memory access controller utilizes one of unsecure IOMMU 51 or secure IOMMU 52 in memory controller 50. Memory controller 50 is configured to facilitate the transfer of data going into and out of system memory 10. To effectively handle any such transaction, memory controller 50 may include one or more MMUs for controlling device access, such as GPU 12, to system memory 10. Unsecure IOMMU 51 and secure IOMMU 52 contain mappings for virtualized memory addresses providing a continuous view of pages for its client. In this example, a client may be any entity that binds or provides one or more resources to GPU 12 (e.g., an application executed by GPU 12 or an application executing on CPU 6). A resource is a container of information (e.g., a memory or buffer) for GPU 12 to use in some manner. In some examples, a resource may have a descriptor that provides information about how the memory is to be used.

In one example of the disclosure, unsecure IOMMU 51 is an IOMMU that is configured to map virtual memory addresses to physical memory addresses in unsecure memory 56. Secure IOMMU 52 is an IOMMU that is configured to map virtual memory addresses to physical memory addresses in secure memory 57. Unsecure IOMMU 51 performs the mappings to unsecure memory 56 using an unsecure page table. The unsecure page table is a page table that maps a range of virtual memory addresses (e.g., the range provided by GPU driver 7) to locations in unsecure memory 56. Likewise, secure IOMMU 52 performs the mappings to secure memory 57 using a secure page table. The secure page table is a page table that maps a range of virtual memory addresses (e.g., the range provided by GPU driver 7) to locations in secure memory 57. As depicted in FIG. 4, unsecure IOMMU 51 and secure IOMMU 52 are part of a single memory controller 50. Memory controller 50 may be one of memory controllers 8 depicted in FIG. 1. In effect, memory controller 50 becomes a secure IOMMU when it is operating with a secure page table, and becomes an unsecure IOMMU when it is operating with an unsecure page table. In other examples, unsecure IOMMU 51 and secure IOMMU 52 may be physically separate MMUs.

In one example of the disclosure, both secure and unsecure page tables are provided to secure IOMMU 52 and unsecure IOMMU 51 by secure operating system (OS) 54 executing on CPU 6. A secure OS is an OS that operates alongside a normal "rich" OS (e.g., Apple iOS, Google Android, Microsoft Windows, etc.). The secure OS provides security applications to protect and separate a secure kernel and any secure peripherals (e.g., secure IOMMU 52) from any code running on the rich OS (e.g., GPU driver 7). An example of a secure OS is the TrustZone software made by ARM Holdings. In general, a secure OS is considered to be much less susceptible to alteration and attack than software running on a rich OS, including software such as graphics drivers. In accordance with the techniques of this disclosure, only the secure OS is allowed to update the page tables for mapping virtual memory address ranges to physical memory addresses. As such, any attempt to alter the graphics driver, including the virtual address ranges provided by the driver, will not result in secure content being stored in unsecure memory, as only the secure OS provides the ultimate mappings to secure and unsecure memory.

In the example where both the secure and unsecure page tables are available at memory controller 50 (e.g., memory controller 50 includes both unsecure IOMMU 51 and secure IOMMU 52), GPU 12 is able to read data from both unsecure memory 56 and secure memory 57 in secure mode. The other read/write restrictions still apply. That is, in secure mode, writes are only made to secure memory 57 by GPU 12, and in unsecure mode both reads and writes by GPU 12 are limited to unsecure memory 56.

In another example of the disclosure, rather than having both a secure and unsecure IOMMU available to the GPU, where data traffic is directed to either the secure or unsecure IOMMU via memory access controller 53, only one IOMMU (i.e., either unsecure IOMMU 51 or secure IOMMU 52) would be made available to GPU 12 depending on the selected memory mode. That is, if the memory mode is the unsecure mode, secure OS 54 only provides page table mappings for the unsecure IOMMU 51. In this situation, the secure IOMMU 52 would be unavailable. If the memory mode is the secure mode, secure OS 54 only provides page table mappings for the secure IOMMU 52. In this situation, the unsecure IOMMU 51 would be unavailable. This example of only having one IOMMU available per memory mode would provide a more simple implementation where both reads and writes were restricted per memory mode. That is, only reads and writes to secure memory 57 by GPU 12 would be allowed in secure mode, while only reads and writes to unsecure memory 56 by GPU 12 would be allowed in unsecure mode. This differs slightly from the approach described above where both IOMMUs may be available, in that the secure mode would no longer allow for reads for unsecure memory 56.

Even when in secure mode, there are some writes, other than the ultimate output product of GPU 12, which would be better for GPU to write to unsecure memory. These writes include the communication tokens between GPU 12 and graphics driver 7. Such data includes timestamps and other ancillary data and control data, such as counter data and query data. GPU 12 uses memory (e.g., unsecure memory 56) to communicate such timestamps and data back to the driver. Since the graphics driver 7 is untrusted, the memory involved in the communication path needs to be unsecure (e.g., unsecure memory 56). As one example, when GPU 12 reaches a certain point in processing, GPU 12 writes a timestamp/sequential marker to memory. Graphics driver 7 uses this information to determine how far the GPU has proceeded in a specific command stream. This determination, for example, allows graphics driver 7 to release memory objects that GPU 12 is operating on, once GPU 12 finishes. There are many other types of signaling and communication paths GPU 12 may use for providing information to graphics driver 7. As another example, graphics driver 7 can request GPU 12 to report performance counters after a drawcall. GPU 12 then writes these performance counters to a memory location (e.g., in unsecure memory 56) specified by graphics driver 7.

To solve this exception to the general rule above that GPU 12 does not write to unsecure memory in secure more, GPU 12 hardware may be modified such that certain hardware blocks are configured to have unsecure memory accesses, while also not having access to data paths and caches that connect to or contain secure content when the GPU is running in secure mode.

Figure 5:
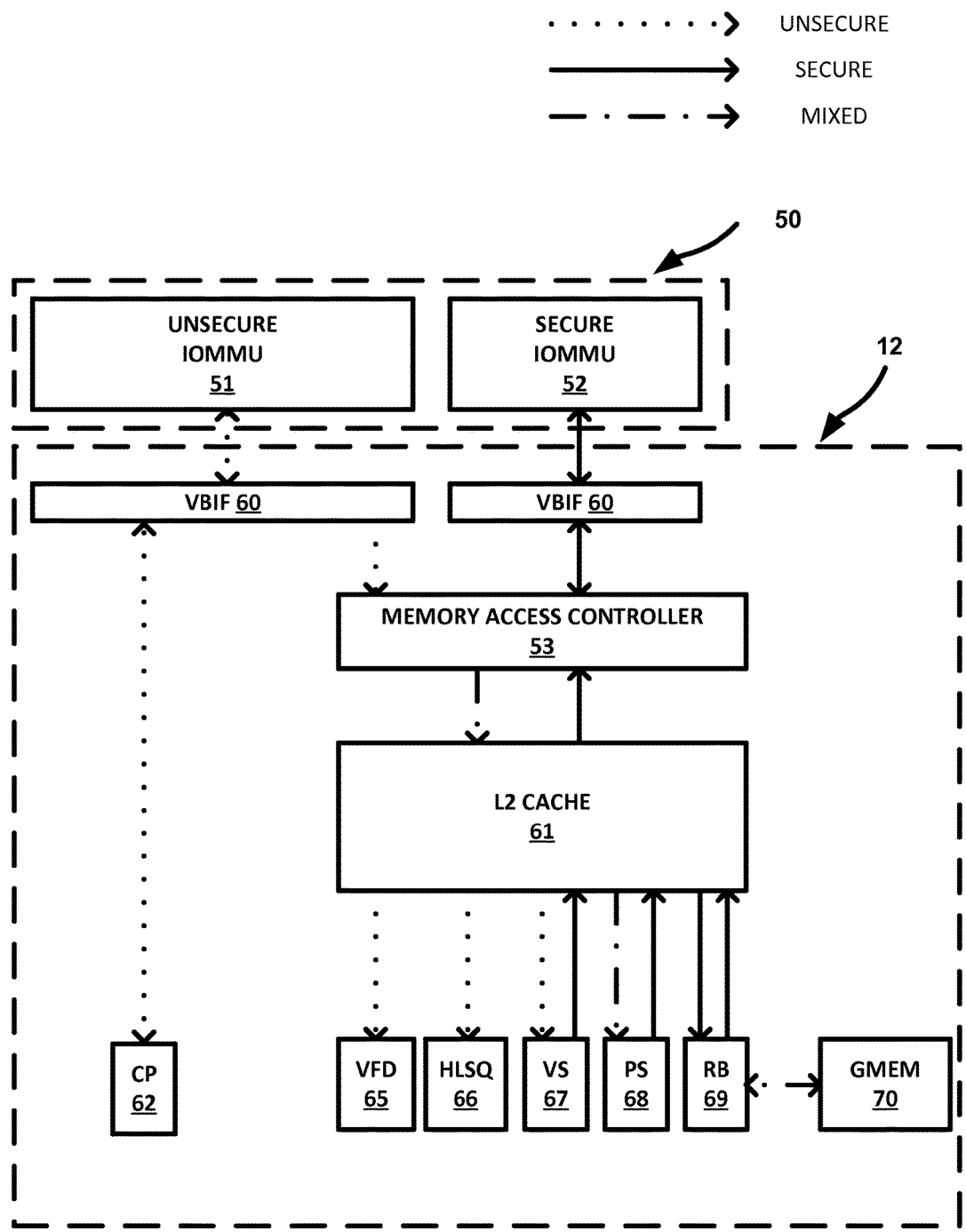
FIG. 5 is a block diagram showing another example structure configured to perform the hardware enforced content protection techniques of this disclosure.

FIG. 5 depicts an example implementation where certain hardware blocks of GPU 12 only have direct access to unsecure memory through the memory interface block (VBIF 60) of GPU 12, and then through unsecure IOMMU 51, even when GPU 12 is in secure mode. One example of such a hardware block is a command processor (CP) 62 block at the front end of the GPU. CP 62 may execute a command engine, such as command engine 32 shown in FIG. 3. CP 62 is responsible for sending messages (via unsecure memory) back to the GPU driver 7. As shown in FIG. 5, CP 62 is configured to have only one physical path to memory (in this case, unsecure memory), through unsecure IOMMU 51. As such, regardless of whether any other hardware blocks of GPU 12 are operating on secure content, CP 62 may never gain access to such secure content. To further ensure that CP 62 has no access to secure content, CP 62 may also be physically isolated from (e.g., have no connections to) any registers that may be used to store secure content, including a debug bus. As shown in FIG. 5, CP 62 has no direct access to L2 cache 61 and graphics memory (GMEM) 70. GMEM 70 is fast memory (often SRAM) that GPU 12 uses as a render target or framebuffer when rendering content for display in some operational modes of GPU 12. L2 cache 61 is a secondary cache that is used to store recently addressed data or frequently used data so that the number of accesses to main memory (e.g., secure memory) may be reduced. L2 cache 61 may also be used to buffer program instructions. Typically, L2 cache 61 is larger than GMEM 70.

Other hardware blocks of GPU 12 may also be configured to only have access to unsecure memory. For example, a primitive control (PC) unit and a visibility stream compressor (VSC) may be configured to only have access to unsecure memory. A PC unit controls how a primitive (e.g., a triangle) progresses or "walks" through a graphics pipeline (e.g., graphics 3D processing pipeline 30 of FIG. 3). A VSC is used in a tile-based or deferred rendering scheme to compress and manage a visibility stream. In general, it may be beneficial, in some circumstances, to avoid requiring certain hardware blocks to write to secure memory. Such circumstances include situations where hardware blocks are not writing secure content, and when hardware blocks are writing control data needed by a graphics driver.

Other hardware blocks in FIG. 5, store content to unsecure memory or secure memory based on the techniques described above. That is, in unsecure mode, data may only be read from or written to unsecure memory. No data may be read from secure memory in unsecure mode. In secure mode, data may only be written to secure memory. No data may be written to unsecure memory in secure mode. However, in secure mode in some examples, data may be read from both secure memory and unsecure memory. These additional hardware blocks of GPU 12 that may access memory according to the memory mode include vertex fetch decode (VFD) unit 65, high level sequencer (HLSQ) 66, vertex shader (VS) 67, pixel shader (PS) 68, and render backend (RB) 69. VFD 65 is responsible for fetching vertex data at the request of CP 62. HLSQ 66 controls the shader processors (i.e., the programmable processors on the GPU that execute shader code), populating the correct state for the job being executed and launching jobs into the shader processor. VS 67 is a vertex shader executing on the shader processor. For example, VS 67 may include vertex shader code that executes geometry processing stage 34 of graphics 3D processing pipeline 30 of FIG. 3. PS 68 is a pixel shader executing on the shader processor. For example, PS 68 may include pixel shader code that executes pixel processing pipeline 38 of graphics 3D processing pipeline 30 of FIG. 3. Render backend (RB) 69 is responsible for writing and reading pixels for the depth buffer and stencil buffer.

Figure 6:
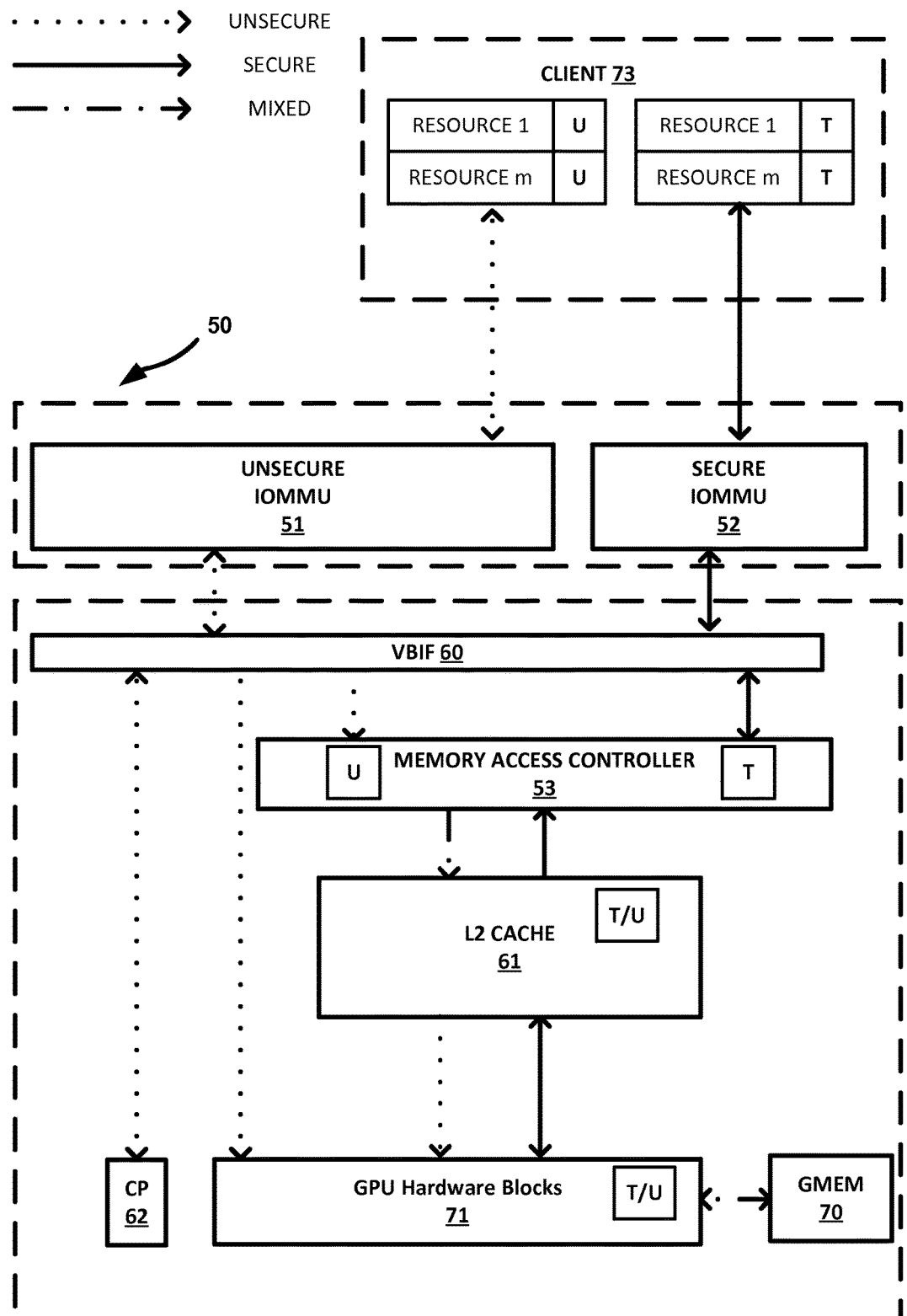
FIG. 6 is a block diagram showing another example structure configured to perform the hardware enforced content protection techniques of this disclosure.

FIG. 6 is a block diagram showing another example structure configured to perform the hardware enforced content protection techniques of this disclosure. In the example of FIG. 6, GPU 12 and memory controller 50 are the same as that described above in FIG. 5, except for the operation of memory access controller 53. In addition, for simplification, various hardware units present in GPU 12 have been generally labeled as such as GPU hardware blocks 71. GPU hardware blocks 71 may include one or more of VFD unit 65, HLSQ 66, VS 67, PS 68, and RB 69.

In the example of FIG. 6, memory access controller 53 may be configured to direct data into a memory unit (e.g., unsecure memory 56 or secure memory 57) based on the memory mode (i.e., unsecure mode or secure mode) of GPU 12 and a resource descriptor associated with a memory resource (e.g., a buffer or cache line storing data, as shown in client 73 of FIG. 6). A resource descriptor, e.g., called a "secure tag," may be associated with each resource to indicate whether the data for the resource should be routed according to the secure mode (e.g., through secure IOMMU 52) or routed according to the unsecure mode (e.g., through unsecure IOMMU 51). As shown in FIG. 6, the resource descriptor may indicate a trusted "T" resource that would use secure IOMMU 52, and an untrusted "U" resource that would use unsecure IOMMU 51.

Using the resource descriptor and the memory mode of GPU 12, memory access controller 53 may be configured to direct memory reads and writes from GPU hardware blocks 71 through L2 cache 61 based on the resource descriptor. Each cache line in L2 cache 61 may include resource descriptor information. In one example, memory access controller 53 may be configured to examine the secure tag information present in the resource for a particular memory transaction (e.g., a read or a write) and determine which of unsecure IOMMU 51 or secure IOMMU 52 to use to route the transaction.

For example, when GPU 12 is set to operate in the secure mode, memory access controller 53 may examine secure tag information in the resource descriptor for the resources in the memory transaction. If the secure tag indicates a trusted resource "T," memory access controller 53 will direct both reads and writes of such secure resources to secure IOMMU 52. In some examples, memory access controller will direct all read and writes of resource having the T resource descriptor to secure IOMMU 52. If the secure tag information indicates an untrusted resource "U," memory access controller 53 will direct (e.g., some or all) reads of such unsecure resources to unsecure IOMMU 51, but will drop or not allow requests (e.g., some or all) for writes of the unsecure resource.

In accordance with the above examples, GPU 12 may be configured to access a first memory unit (e.g., system memory 10) according to one of an unsecure mode and a secure mode and a respective resource descriptor associated with each of a plurality of memory resources. Memory access controller 53 may be configured to read the resource descriptor of the plurality of memory resources and receive a request for a memory transaction to the first memory unit.

Memory access controller 53 may be further configured to, in response to the request, direct read and write memory transactions relating to memory resources of the plurality of memory resources having a secure resource descriptor to a secure portion of the first memory unit when GPU 12 is operating according to the secure mode. Memory access controller 53 may be further configured to, in response to the request, direct read memory transactions relating to memory resources of the plurality of memory resources having an unsecure resource descriptor to an unsecure portion of the first memory unit when GPU 12 is operating according to the secure mode. Memory access controller 53 may be further configured to, in response to the request, drop write memory transactions relating to memory resources of the plurality of memory resources having the unsecure resource descriptor when the GPU is operating according to the secure mode.

In another example of the disclosure, memory access controller 53 may be further configured to, in response to the request, direct read and write memory transactions relating to memory resources of the plurality of memory resources having the unsecure resource descriptor to an unsecure portion of the first memory unit when the GPU is operating according to the unsecure mode. Memory access controller 53 may be further configured to, in response to the request, drop read and write memory transactions relating to memory resources of the plurality of memory resources having the secure resource descriptor when the GPU is operating according to the unsecure mode.

Figure 7A:
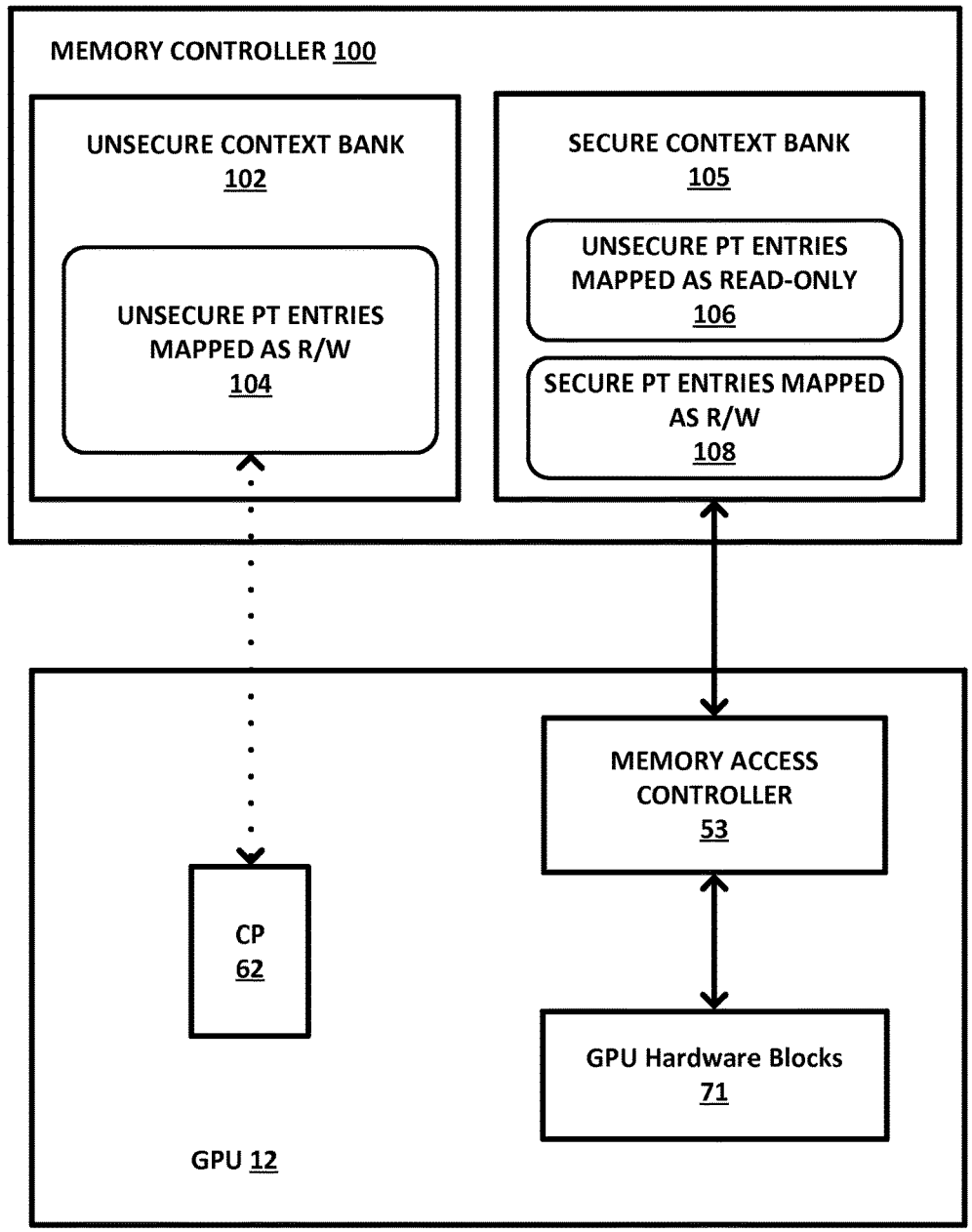
FIG. 7A is a block diagram showing another example structure configured to perform the hardware enforced content protection techniques of this disclosure.
Figure 7B:
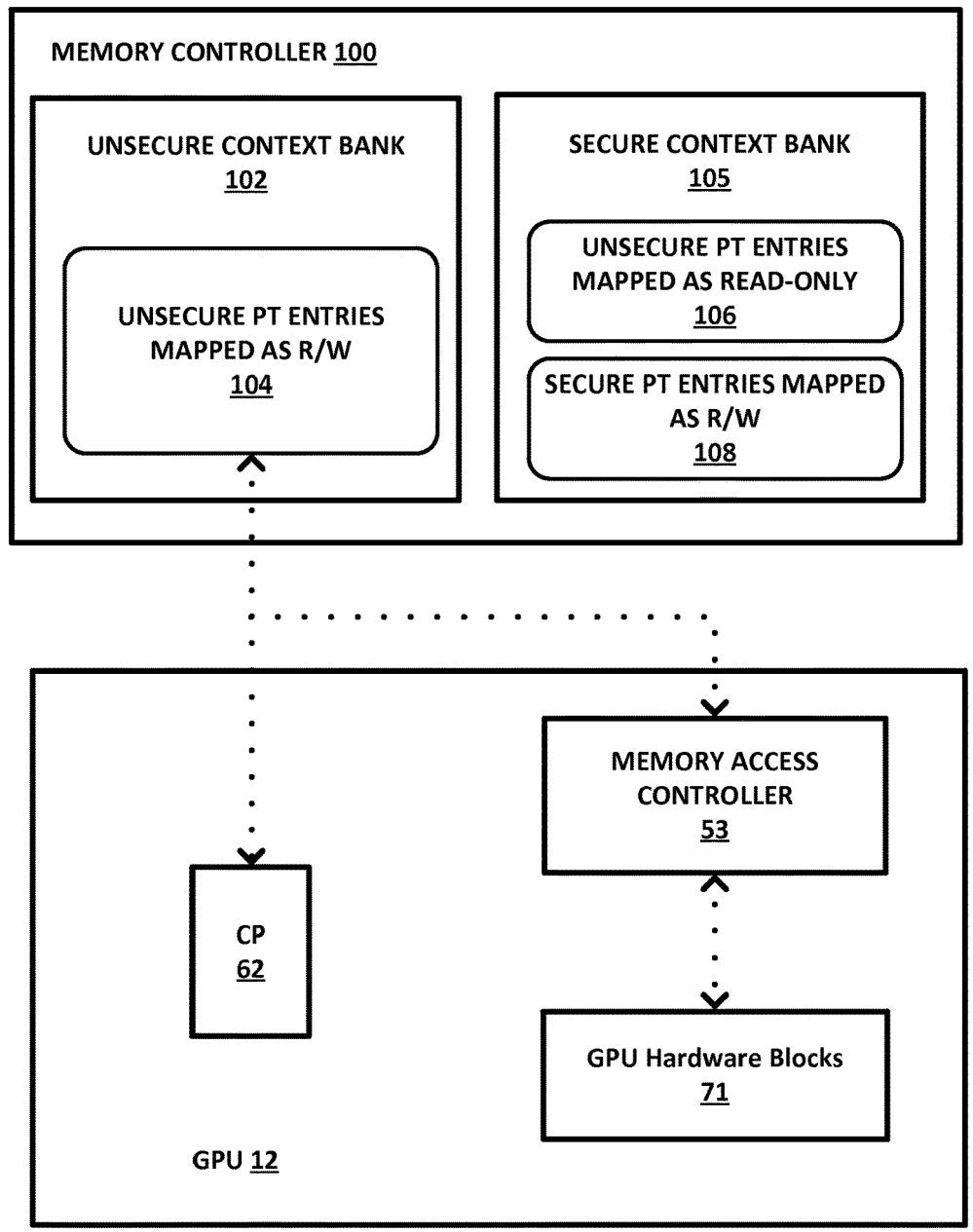
FIG. 7B is a block diagram showing another example structure configured to perform the hardware enforced content protection techniques of this disclosure.

FIGS. 7A and 7B are block diagrams showing other example structures configured to perform the hardware enforced content protection techniques of this disclosure. In the examples of FIGS. 7A and 7B, memory controller 100 may include one or more MMUs. As described above, an MMU implements a virtualized memory scheme providing a continuous view of pages for its client. The virtual memory space may be divided into virtual pages. The MMUs may implement one or more context banks to maintain these virtual page tables. The context banks may include both page table (PT) entries that map virtual memory addresses to physical memory addresses, as well as rules that indicate whether reads, writes, or both reads and writes are allowed for the particular PT entries in each context bank.

In the example of FIGS. 7A and 7B, an MMU of memory controller 100 may include an unsecure context bank 102 and a secure context bank 105. Unsecure context bank 102 may include unsecure PT entries 104 that are mapped for read-only access. Unsecure PT entries 104 may include mappings from virtual memory addresses to physical memory addresses in unsecure memory 56. Since unsecure PT entries 104 are mapped for read-only access, memory controller 100, using unsecure context bank 102, is only able to read from unsecure memory 56. Secure context bank 105 may include unsecure PT entries 106 that are mapped for read-only access, and secure PT entries 108 that are mapped for both read and write access (R/W). Unsecure PT entries 106 may include mappings from virtual memory addresses to physical memory addresses in unsecure memory 56. Secure PT entries 106 may include mappings from virtual memory addresses to physical memory addresses in secure memory 57.

When GPU 12 is placed in secure mode using one of the techniques discussed above, memory access controller 53 may be configured to direct memory transactions for GPU hardware blocks 71 to secure context bank 105 of memory controller 100. If GPU 12, or an instruction from a client using GPU 12, attempts to perform a write into an unsecure resource (e.g., unsecure memory 56), memory controller 100 is configured to issue a page fault since the PT entries in unsecure context bank 102 are mapped as read only in secure context bank 105. The page fault indicates to the client that such a memory transaction is not allowed.

In one example of the disclosure, CP 62 may be configured to always operate in unsecure mode irrespective of the memory mode of GPU 12. That is, CP 62 may be configured to always use unsecure context bank 102. FIG. 7A shows the flow of memory transactions from GPU 12 to unsecure context bank 102 and secure context bank 105 when GPU 12 is in secure mode. FIG. 7B shows the flow of memory transactions from GPU 12 to unsecure context bank 102 and secure context bank 105 when GPU 12 is in unsecure mode.

To reiterate, GPU 12 may be configured to access a memory (e.g., unsecure memory 56 or secure memory 57) according to one of an unsecure mode and a secure mode. GPU 12 may include memory access controller 53 that is configured to direct memory transactions from at least one hardware unit (e.g., one or more of GPU hardware blocks 71) of the GPU 12 to secure context bank 105 in memory controller 100 when GPU 12 is operating in a secure mode. Memory access controller 53 may also be configured to direct memory transactions from the at least one hardware unit of GPU 12 to unsecure context bank 102 in memory controller 100 when GPU 12 is operating in the unsecure mode.

As described above, secure context bank 105 may include read-only page table entries to the unsecure portion of the memory (e.g., unsecure memory 56) and read/write page table entries to the secure portion of the memory (e.g., secure memory 57). Unsecure context bank 102 may include read-only page table entries to the unsecure portion of the memory (e.g., unsecure memory 56). In one example, memory controller 100 may be configured to issue a page fault when a request to write data into an address contained within the read-only page table entries of secure context bank 105 is received.

In any of the examples described above, when GPU 12 transitions from secure mode to unsecure mode, there may be secure content remaining within various caches, memories and registers of GPU 12. In one example of the disclosure, a mechanism is provided to clear and/or invalidate the various storage units of GPU 12 that may hold secure content before allowing an unsecure job using the unsecure memory mode to launch on GPU 12.

In this context, clearing a memory means that data stored in the memory is erased and/or allowed to be overwritten. In practice, clearing may involve de-allocating all memory addresses for the memory unit such that all data in the memory unit may be overwritten. In other examples, clearing may involve overwriting all data in the memory unit (e.g., with all 1's or all 0's), such that any previously stored data is no longer available. If a memory unit is not cleared, an unsecure job could copy the trailing remains of secure data to unsecure memory. This problem can be solved via secure software techniques, hardware techniques, or a combination of both techniques. Regardless, the clearing and transition to unsecure may be an atomic operation, since this operation is triggered by the unsecure driver. In this context, an atomic operation includes the clearing of internal GPU 12 memories together (i.e., atomically) with the transition back to unsecure mode. For example, there must be a single "command" that does both (changing modes and clearing internal memories); otherwise malicious software could just perform the transition back to an unsecure mode, and not execute the clearing operation.

In some examples, it may not be necessary to clear all storage units of GPU 12 when transitioning from secure mode to unsecure mode. Instead, only a portion of the storage units need to be cleared to effectively prevent unauthorized access to secure content. As one example, only half the content stored may be cleared. As another example, every other chunk of data (e.g., every other 32 bytes of data) may be cleared.

Figure 8:
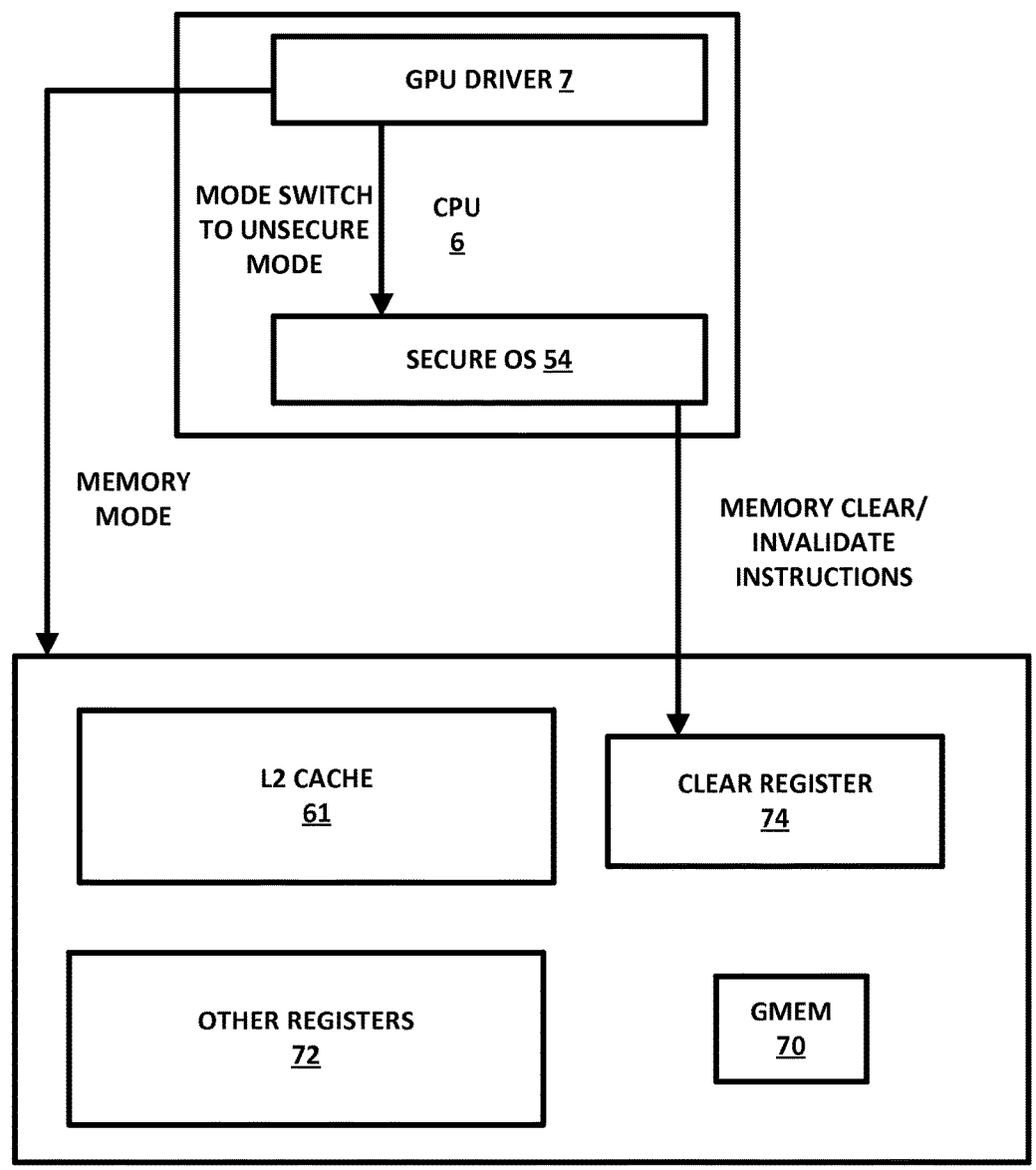
FIG. 8 is a block diagram showing cache clearing techniques according to one example of this disclosure.

FIG. 8 is a block diagram showing cache clearing techniques according to one example of this disclosure. In the example of FIG. 8, a secure software solution is used to transition the GPU between secure and unsecure modes. In one example, a GPU register (e.g., clear register 74) is under the control of secure software (e.g., secure OS 54) running on the host CPU 6. If the GPU driver 7 switches the memory mode of GPU 12 from unsecure mode to secure mode, GPU driver 7 would also call secure software in secure OS 54 to clear any secure content remaining on caches, memories or registers of GPU 12, including L2 cache 61, GMEM 70, and other registers 72. At that point, the secure OS 54 could first launch a job on the GPU 12 by writing memory clear and/or invalidate instructions into clear register 74. Such instructions would result in all of the remaining secure data in GPU 12 being cleared. Such instructions may be a combination of a shader program, memory writes and/or register programmings (e.g., a GPU L2 cache invalidate).

Figure 9:
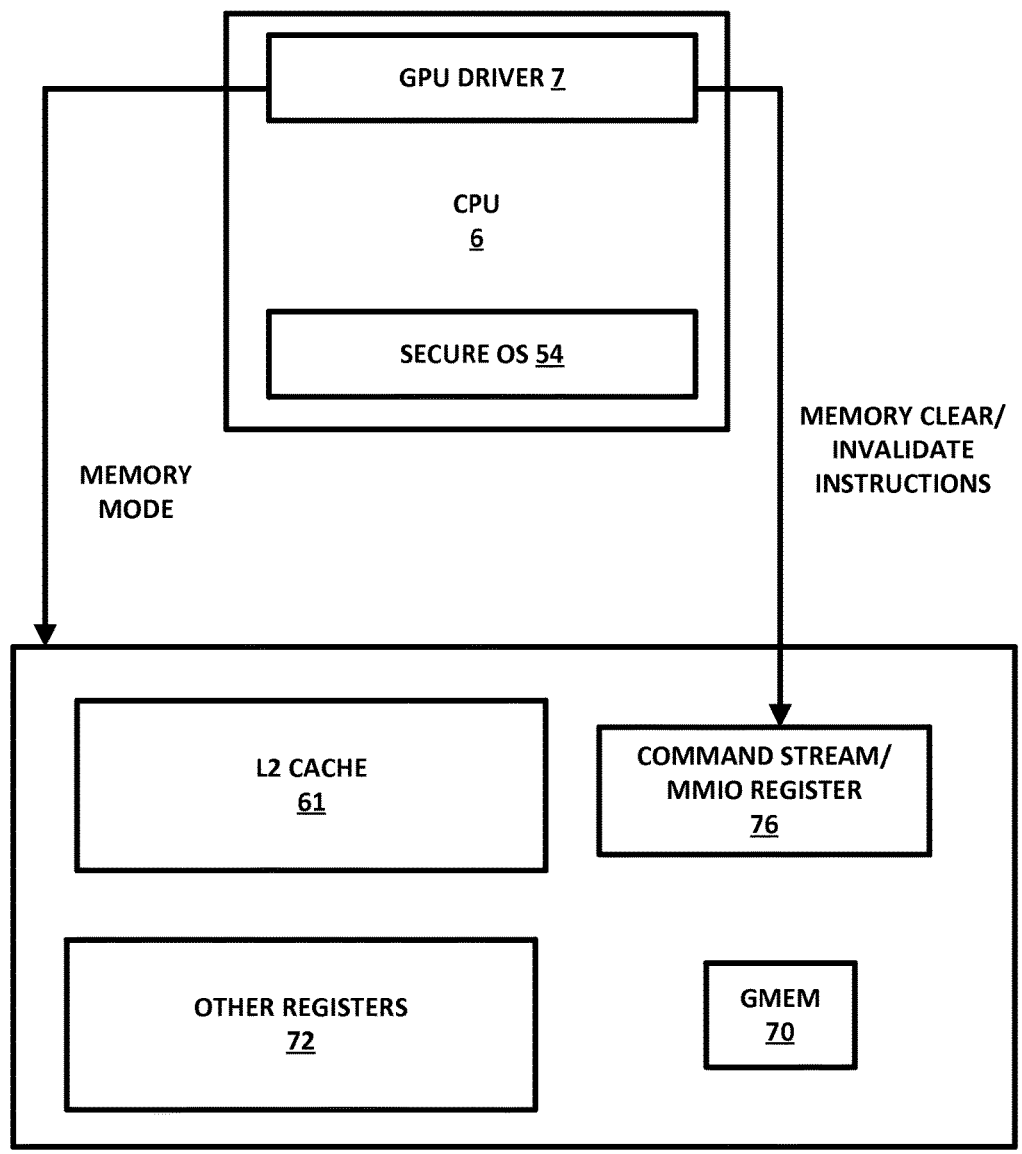
FIG. 9 is a block diagram showing cache clearing techniques according to another example of this disclosure.

FIG. 9 is a block diagram showing cache clearing techniques according to another example of this disclosure. In the example of FIG. 9, a hardware solution is used to transition the GPU 12 between secure and unsecure modes. In this example, an externally visible (e.g., memory-mapped input/output (MMIO)) or internal (e.g., command stream) register 76 may be configured so that it is directly written to by the graphics driver 7. Hardware of GPU 12 may be configured such that, when register 76 is written (e.g., when going from secure mode to unsecure mode), the hardware of GPU 12 completes the current secure job, drains the pipeline (i.e., removes any remaining secure content being processed), and clears and/or invalidates all registers, memories, and caches that could contain secure content, including L2 cache 61, GMEM 70, and other registers 72. This clearing process may include using hardwired or securely loaded and protected shader code resident on GPU 12.

Figure 10:
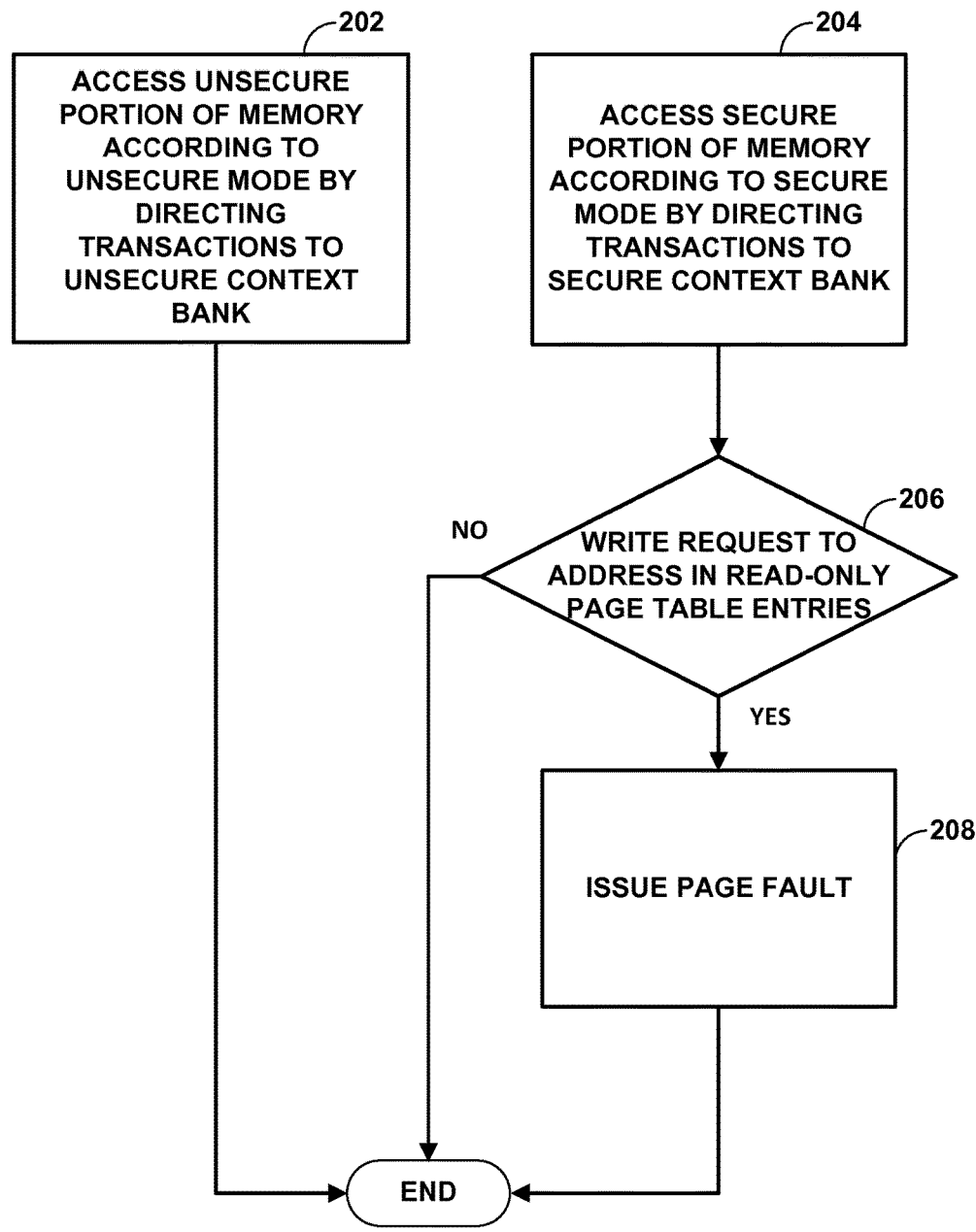
FIG. 10 is a flowchart illustrating a method according to one example of the disclosure.

FIG. 10 is a flowchart illustrating a method according to one example of the disclosure. GPU 12, including memory access controller 53, and memory controller 100 may be configured to perform the techniques of FIG. 10.

In one example of the disclosure, memory access controller 53 may be configured to access an unsecure portion of a memory (e.g., system memory 10) according to an unsecure mode by directing memory transactions from at least one hardware unit of GPU 12 to an unsecure context bank in memory controller 100 (202). Memory access controller 53 may be further configured to access a secure portion of the memory according to a secure mode by directing memory transactions from the at least one hardware unit of GPU 12 to a secure context bank in memory controller 100 (204). In one example of the disclosure, the secure context bank includes read-only page table entries to the unsecure portion of the memory and read/write page table entries to the secure portion of the memory, and the unsecure context bank includes read-only page table entries to the unsecure portion of the memory. In another example of the disclosure, memory controller 100 may be configured to issue a page fault (208) when a request to write data into an address contained within the read-only page table entries of the secure context bank is received (206).

In another example of the disclosure, the at least one hardware unit of the GPU includes one or more of a vertex fetch decode unit, a high level sequencer, a vertex shader, a pixel shader, and a render backend unit.

In another example of the disclosure, GPU 12 may be configured to access the unsecure portion of the memory, with a front end command processor, through the unsecure context bank regardless of whether GPU 12 is operating in the unsecure mode or the secure mode.

In another example of the disclosure, GPU driver 7 may be configured to place GPU 12 in the secure mode or the unsecure mode. In a further example of the disclosure, GPU 12 may be configured to receive, from GPU driver 7, an instruction to a command stream register of GPU 12 to clear and invalidate one or more internal memories of GPU 12. GPU 12 may be further configured to clear and invalidate at least some content from the one or more internal memories of GPU 12 when GPU 12 is transitioned from the secure mode to the unsecure mode based on the instruction in the command stream register.

In another example of the disclosure, GPU 12 may be configured to receive, at a clear register, an indication to clear and invalidate one or more internal memories of the GPU, and clear and invalidate at least some content from the one or more internal memories of GPU 12 when GPU 12 is transitioned from the secure mode to the unsecure mode based on the indication in the clear register.

Figure 11:
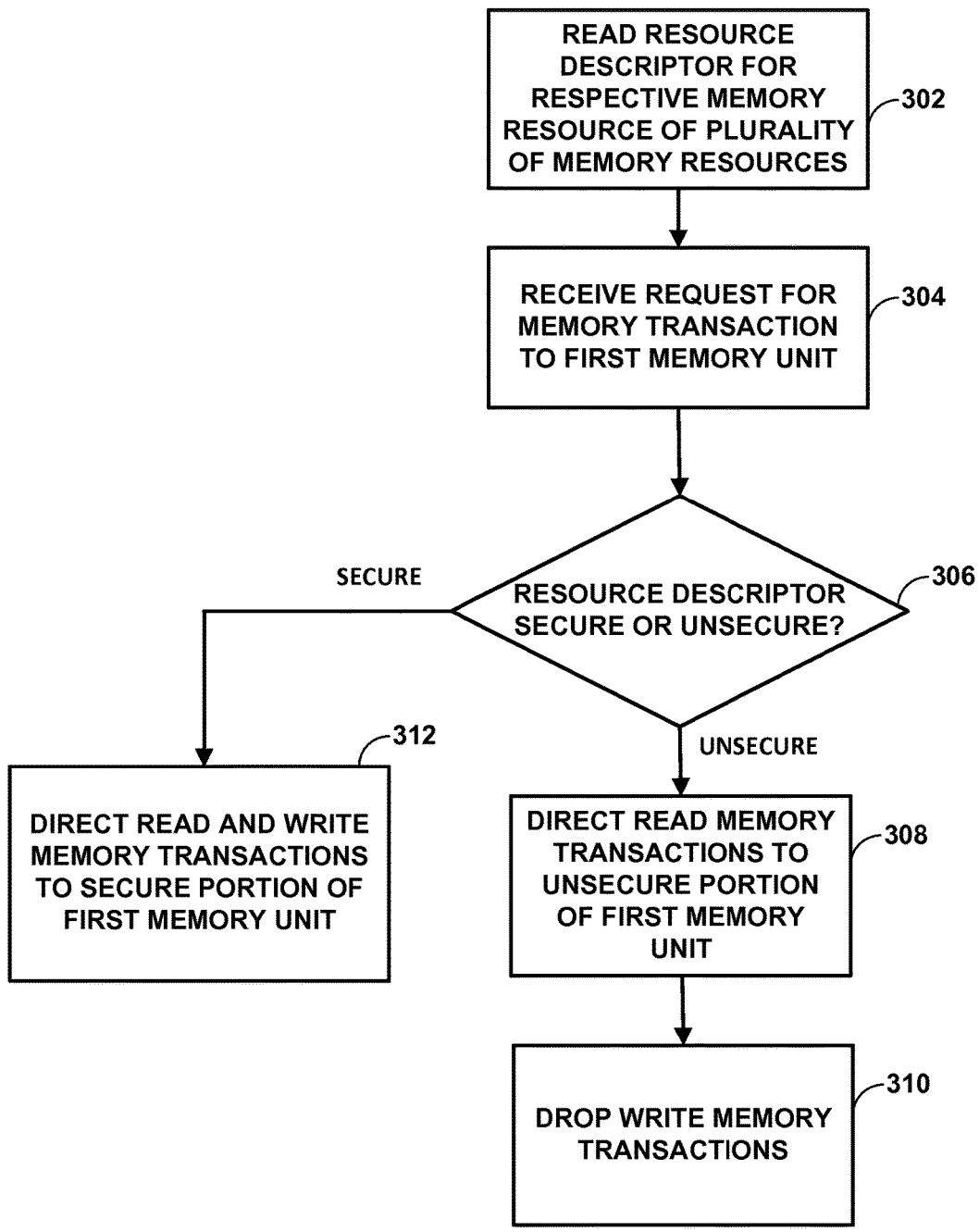
FIG. 11 is a flowchart illustrating another example method according to another example of the disclosure.

FIG. 11 is a flowchart illustrating a method according to one example of the disclosure. GPU 12, including memory access controller 53, may be configured to perform the techniques of FIG. 11.

In one example of the disclosure, GPU 12 may be configured to access a first memory unit (e.g., system memory 10) according to one of an unsecure mode and a secure mode and a respective resource descriptor associated with each of a plurality of memory resources. Memory access controller 53 may be configured to read the respective resource descriptor associated with each of the plurality of memory resources (302) and receive a request for a memory transaction to the first memory unit (304).

Memory access controller 53 may be further configured to determine whether the resource descriptor associated with the memory resource related to the request for the memory transaction is a secure or unsecure resource descriptor (306). Memory access controller 53 may be further configured to direct, in response to the request, read and write memory transactions relating to memory resources of the plurality of memory resources for which the respective resource descriptor is a secure resource descriptor to a secure portion of the first memory unit when GPU 12 is operating according to the secure mode (312). Memory access controller 53 may be further configured to direct, in response to the request, read memory transactions relating to memory resources of the plurality of memory resources for which the respective resource descriptor is an unsecure resource descriptor to an unsecure portion of the first memory unit when GPU 12 is operating according to the secure mode (308). Memory access controller 53 may also be configured to drop, in response to the request, write memory transactions relating to memory resources of the plurality of memory resources for which the respective resource descriptor is the unsecure resource descriptor when GPU 12 is operating according to the secure mode (310).

In another example of the disclosure, memory access controller 53 is further configured to, in response to the request, direct read and write memory transactions relating to memory resources of the plurality of memory resources for which the respective resource descriptor is the unsecure resource descriptor to an unsecure portion of the first memory unit when GPU 12 is operating according to the unsecure mode, and in response to the request, drop read and write memory transactions relating to memory resources of the plurality of memory resources for which the respective resource descriptor is the secure resource descriptor when GPU 12 is operating according to the unsecure mode.

In another example of the disclosure, memory access controller 53 is configured to write data to the secure portion of the first memory unit by utilizing a secure memory management unit, the secure memory management unit utilizing a secure page table containing address ranges for the secure portion of the first memory unit. In another example of the disclosure, memory access controller 53 is configured to read data from the unsecure portion of the first memory unit by utilizing an unsecure memory manage unit, the unsecure memory management unit utilizing an unsecure page table containing address ranges for the unsecure portion of the first memory unit.

In another example of the disclosure, memory access controller 53 is configured to read and write data according to a virtual memory address from a range of virtual memory address, wherein the range of virtual memory addresses includes a first range of virtual memory addresses relating to entries in the secure page table utilized by the secure memory management unit, and a second range of virtual memory addresses relating to entries in the unsecure page table utilized by the unsecure memory management unit.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for graphics processing comprising:
   a graphics processing unit (GPU) configured to access a first memory unit according to one of an unsecure mode and a secure mode and a respective resource descriptor associated with each of a plurality of memory resources, wherein each respective resource descriptor includes tag information indicating how each respective memory resource of the plurality of memory resources is to be used, and wherein each respective resource descriptor is a secure resource descriptor or an unsecure resource descriptor, each secure resource descriptor allowing reads and writes to associated memory resources of the plurality of memory resources in the secure mode, each unsecure resource descriptor allowing reads from associated resources of the plurality of memory resources in the secure mode, and each unsecure resource descriptor disallowing writes to associated resources of the plurality of memory resources in the secure mode, the GPU comprising:
      a memory access controller configured to read the respective resource descriptor associated with each of the plurality of memory resources,
      the memory access controller configured to receive a request for a memory transaction to the first memory unit,
      the memory access controller configured to, in response to the request, direct all read and write memory transactions relating to memory resources of the plurality of memory resources for which the respective resource descriptor is the secure resource descriptor to a secure portion of the first memory unit when the GPU is operating according to the secure mode,
      the memory access controller configured to, in response to the request, direct all read memory transactions relating to memory resources of the plurality of memory resources for which the respective resource descriptor is the unsecure resource descriptor to an unsecure portion of the first memory unit when the GPU is operating according to the secure mode, and
      the memory access controller configured to, in response to the request, drop all write memory transactions relating to memory resources of the plurality of memory resources for which the respective resource descriptor is the unsecure resource descriptor when the GPU is operating according to the secure mode; and
      a front end command processor configured to write data to the unsecure portion of the first memory regardless of whether the GPU is in the unsecure mode or the secure mode, wherein the front end command processor does not have read access to the secure portion of the first memory unit.

2. The apparatus of claim 1, wherein the memory access controller is further configured to, in response to the request, direct read and write memory transactions relating to memory resources of the plurality of memory resources for which the respective resource descriptor is the unsecure resource descriptor to an unsecure portion of the first memory unit when the GPU is operating according to the unsecure mode, and
   the memory access controller is further configured to, in response to the request, drop read and write memory transactions relating to memory resources of the plurality of memory resources for which the respective resource descriptor is the secure resource descriptor when the GPU is operating according to the unsecure mode.

3. The apparatus of claim 1, wherein the memory access controller is configured to write data to the secure portion of the first memory unit utilizing a secure memory management unit, the secure memory management unit utilizing a secure page table containing address ranges for the secure portion of the first memory unit, and wherein the memory access controller is configured to read data from the unsecure portion of the first memory unit utilizing an unsecure memory management unit, the unsecure memory management unit utilizing an unsecure page table containing address ranges for the unsecure portion of the first memory unit.

4. The apparatus of claim 3, wherein the memory access controller reads and writes data according to a virtual memory address from a range of virtual memory addresses, wherein the range of virtual memory addresses includes a first range of virtual memory addresses relating to entries in the secure page table utilized by the secure memory management unit, and a second range of virtual memory addresses relating to entries in the unsecure page table utilized by the unsecure memory management unit.

5. The apparatus of claim 4, further comprising:
   a second memory unit storing a graphics driver, the graphics driver configured to place the GPU in the secure mode or the unsecure mode.

6. The apparatus of claim 5, further comprising:
   the secure memory management unit;
   the unsecure memory management unit; and
   a central processing unit (CPU) executing a secure operating system and the graphics driver, the secure operating system configured to supply the secure page table to the secure memory management unit and the unsecure page table to the unsecure memory management unit.

7. The apparatus of claim 6, wherein the GPU further comprises a clear register and one or more internal memories, and wherein the secure operating system is configured to send an instruction to the clear register that causes the GPU to clear and invalidate at least some content from the one or more internal memories when the GPU is transitioned from the secure mode to the unsecure mode.

8. The apparatus of claim 6, wherein the GPU further comprises a command stream register and one or more internal memories, and wherein the graphics driver is configured to send an instruction to the command stream register that causes the GPU to clear and invalidate at least some content from the one or more internal memories when the GPU is transitioned from the secure mode to the unsecure mode.

9. A method comprising:
reading a respective resource descriptor for a respective memory resource of a plurality of memory resources, wherein each respective resource descriptor includes tag information indicating how each respective memory resource of the plurality of memory resources is to be used, and wherein each respective resource descriptor is a secure resource descriptor or an unsecure resource descriptor, each secure resource descriptor allowing reads and writes to associated memory resources of the plurality of memory resources in a secure mode, each unsecure resource descriptor allowing reads from associated resources of the plurality of memory resources in the secure mode, and each unsecure resource descriptor disallowing writes to associated resources of the plurality of memory resources in the secure mode;
receiving a request for a memory transaction to a first memory unit;
directing, in response to the request, read and write memory transactions relating to memory resources of the plurality of memory resources for which the respective resource descriptor is the secure resource descriptor to a secure portion of the first memory unit when a graphics processing unit (GPU) is operating according to the secure mode;
directing, in response to the request, read memory transactions relating to memory resources of the plurality of memory resources for which the respective resource descriptor is the unsecure resource descriptor to an unsecure portion of the first memory unit when the GPU is operating according to the secure mode;
dropping, in response to the request, write memory transactions relating to memory resources of the plurality of memory resources for which the respective resource descriptor is the unsecure resource descriptor when the GPU is operating according to the secure mode; and
writing data, by a front end command processor configured, to the unsecure portion of the first memory regardless of whether the GPU is in the unsecure mode or the secure mode, wherein the front end command processor does not have read access to the secure portion of the first memory unit.

10. The method of claim 9, further comprising:
directing, in response to the request, read and write memory transactions relating to memory resources of the plurality of memory resources for which the respective resource descriptor is the unsecure resource descriptor to an unsecure portion of the first memory unit when the GPU is operating according to the unsecure mode; and
dropping, in response to the request, read and write memory transactions relating to memory resources of the plurality of memory resources for which the respective resource descriptor is the secure resource descriptor when the GPU is operating according to the unsecure mode.

11. The method of claim 9, further comprising: writing data to the secure portion of the first memory unit utilizing a secure memory management unit, the secure memory management unit utilizing a secure page table containing address ranges for the secure portion of the first memory unit; and reading data from the unsecure portion of the first memory unit utilizing an unsecure memory management unit, the unsecure memory management unit utilizing an unsecure page table containing address ranges for the unsecure portion of the first memory unit.

12. The method of claim 11, further comprising:
reading and writing data according to a virtual memory address from a range of virtual memory addresses, wherein the range of virtual memory addresses includes a first range of virtual memory addresses relating to entries in the secure page table utilized by the secure memory management unit, and a second range of virtual memory addresses relating to entries in the unsecure page table utilized by the unsecure memory management unit.

13. The method of claim 12, further comprising:
placing the GPU in the secure mode or the unsecure mode.

14. The method of claim 13, further comprising:
supplying the secure page table to the secure memory management unit and the unsecure page table to the unsecure memory management unit.

15. The method of claim 14, further comprising:
sending an instruction to a clear register of the GPU; and
clearing and invalidating, in response to the instruction, at least some content from the one or more internal memories when the GPU is transitioned from the secure mode to the unsecure mode.

16. The method of claim 14, further comprising:
sending an instruction to a command stream register of the GPU; and
clearing and invalidating, in response to the instruction, at least some content from the one or more internal memories when the GPU is transitioned from the secure mode to the unsecure mode.

* * * * *